United States Patent [19]

Ensch

[11] Patent Number: 5,253,749
[45] Date of Patent: Oct. 19, 1993

[54] OPEN AREA CONVEYOR ASSEMBLY

[75] Inventor: Peter J. Ensch, Milwaukee, Wis.

[73] Assignee: Rexnord Corporation, Milwaukee, Wis.

[21] Appl. No.: 902,761

[22] Filed: Jun. 23, 1992

Related U.S. Application Data

[63] Continuation of Ser. No. 603,892, Oct. 25, 1990, abandoned.

[51] Int. Cl.⁵ .............................................. B65G 17/06
[52] U.S. Cl. ................................. 198/850; 198/834; 198/853
[58] Field of Search ............... 198/834, 850, 851, 852, 198/853

[56] References Cited

U.S. PATENT DOCUMENTS

| Re. 30,341 | 7/1980 | Lapeyre | 198/834 |
|---|---|---|---|
| D. 270,201 | 8/1983 | Hodlewsky et al. | 34/29 |
| D. 282,907 | 3/1986 | Schroeder et al. | 34/29 |
| D. 284,640 | 7/1986 | Schroeder et al. | 34/29 |
| D. 286,136 | 10/1986 | Schroeder et al. | 8/499 |
| 270,202 | 8/1983 | Hodlewsky et al. | D34/29 |
| 3,870,141 | 3/1975 | Lapeyre et al. | 198/193 |
| 4,159,763 | 7/1979 | Kewley et al. | 198/853 |
| 4,438,838 | 3/1984 | Hodlewsky et al. | 198/853 |
| 4,556,142 | 12/1985 | Lapeyre | 198/822 |
| 4,688,670 | 8/1987 | Lapeyre | 198/853 |
| 4,832,187 | 5/1989 | Lapeyre | 198/851 |
| 4,865,183 | 9/1989 | Hodlewsky et al. | 198/834 |
| 4,972,942 | 11/1990 | Faulkner | 198/853 |

FOREIGN PATENT DOCUMENTS 0113669  10/1900  Fed. Rep. of Germany ...... 198/852

*Primary Examiner*—Joseph E. Valenza
*Assistant Examiner*—Tuan N. Nguyen
*Attorney, Agent, or Firm*—Michael, Best & Friedrich

[57] ABSTRACT

A conveyor chain assembly including a plurality of modules which are pivotally connected by a plurality of chain pins and which include a plurality of link ends which have a bore housing a chain pin and an opening exposing the chain pin, a plurality of reach bars extending between the link ends and having a convex upper surface, and a support rib extending between the reach bars, the link ends, reach bars and support rib providing a support surface and defining therebetween a plurality of openings adapted to provide a free flow of fluid therethrough in a direction generally perpendicular to the support surface.

10 Claims, 2 Drawing Sheets

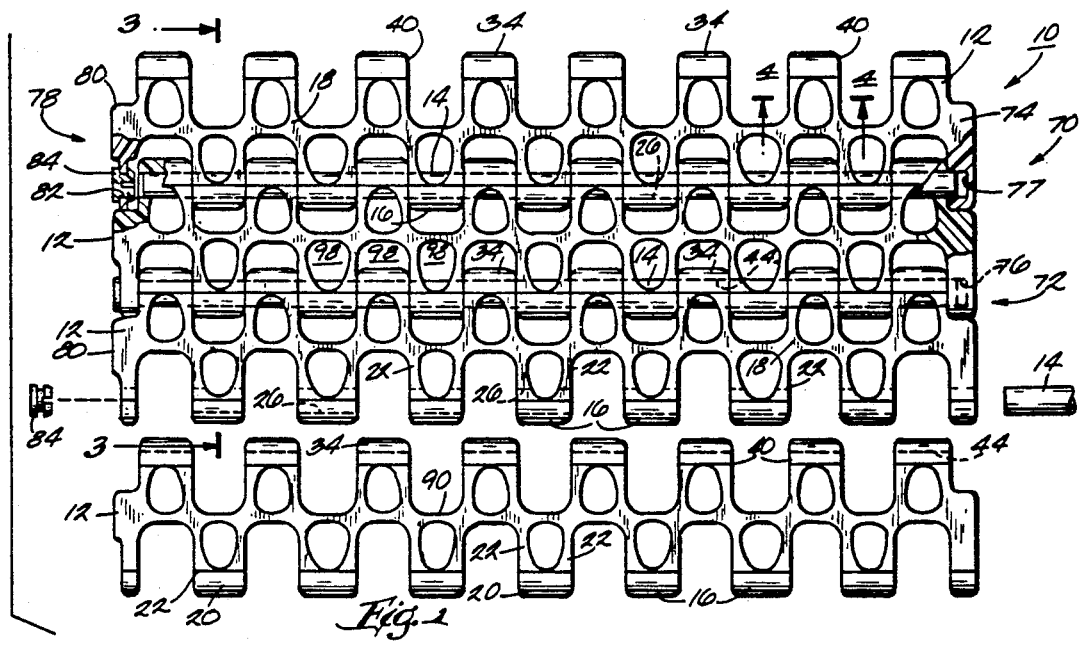
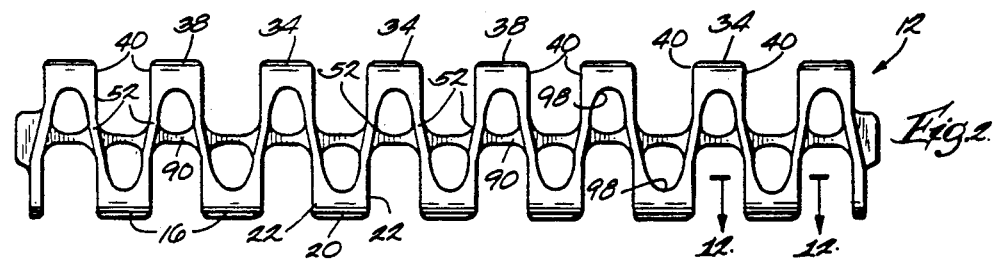
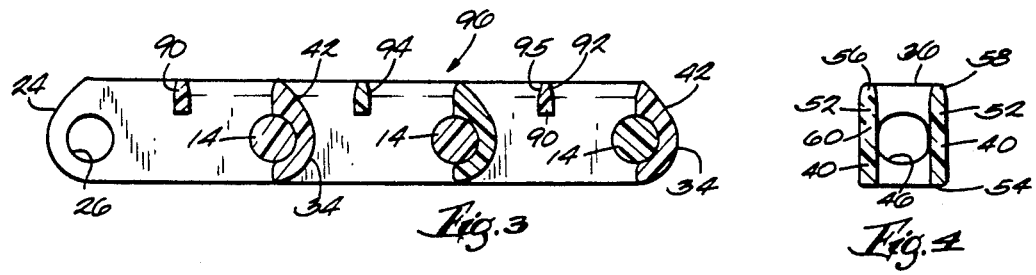
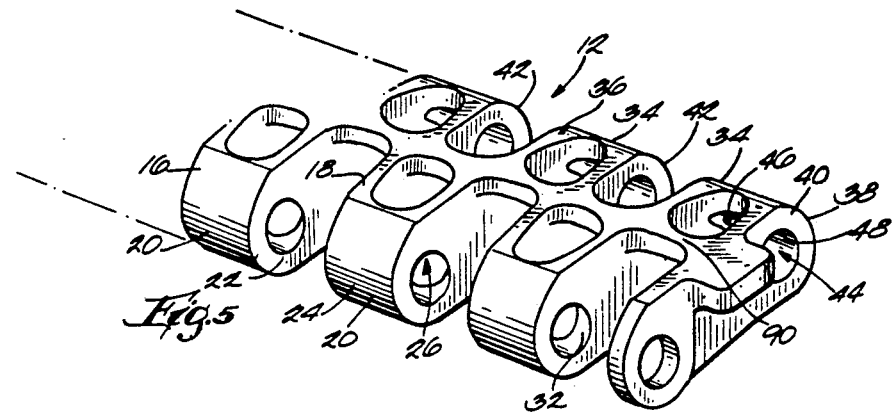

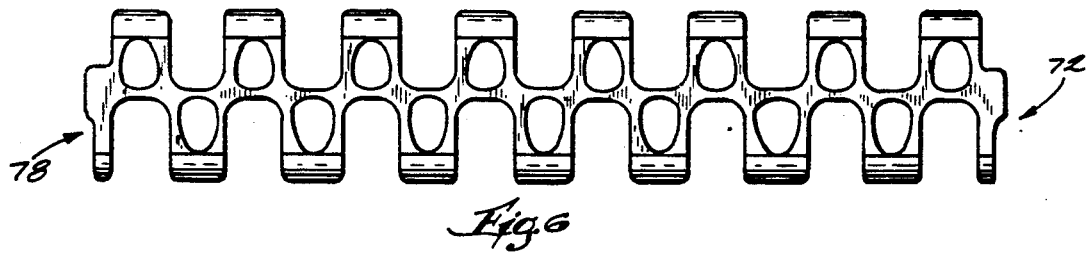
Fig. 6
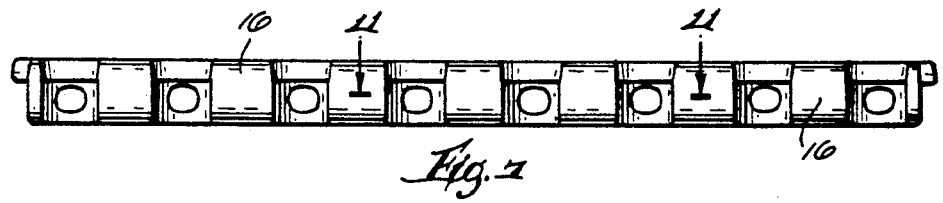
Fig. 7
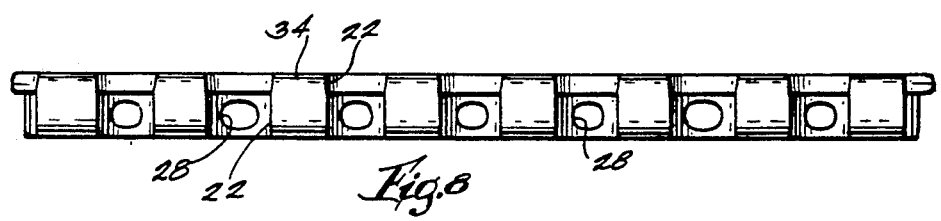
Fig. 8
Fig. 9
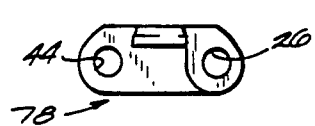
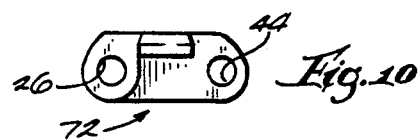
Fig. 10
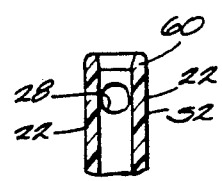
Fig. 12
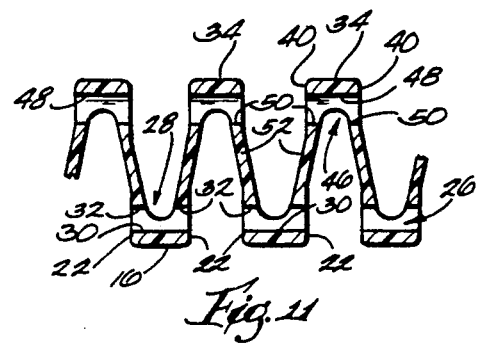
Fig. 11

OPEN AREA CONVEYOR ASSEMBLY

RELATED APPLICATIONS

This is a continuation of U.S. patent application Ser. No. 603,892 filed Oct. 25, 1990, now abandoned.

BACKGROUND OF THE INVENTION

1. Technical Field

The invention relates generally to conveyor chain assemblies, and more particularly to open area conveyor chain assemblies.

2. Related Prior Art

It is generally known to provide a conveyor chain assembly including a plurality of molded plastic modules, the modules including a large number of link ends on their forward and rearward ends and an upper surface for supporting articles to be conveyed by the chain assembly. The link ends have axially aligned bores intended to house chain pins which extend through the bores and connect the modules together. It is also generally known to provide a conveyor chain assembly comprising modules configured so as to allow flow of fluid through the conveyor assembly. Such conveyor assemblies can be useful for the transport of products such as food through freezing or drying chambers wherein cold or dry air is caused to flow through the chain conveyor. These conveyor assemblies are also used in connection with the transport of products through heating chambers, steaming chambers or washing apparatus as well as in other similar applications. U.S. Pat. No. 4,556,142, which issued to Lapeyre on Dec. 3, 1985, illustrates an example of such an open area conveyor assembly including a plurality of modules linked together by a plurality of chain pins. U.S. Pat. No. 3,870,141, which issued to Lapeyre et al. on Mar. 11, 1975, illustrates another example of an open area conveyor assembly including a plurality of modules linked together by a plurality of chain pins.

U.S. Pat. No. 4,159,763, which issued to Kewley et al. on Jul. 3, 1979, discloses another example of an open area conveyor assembly including a plurality of modules linked together by a plurality of chains pins. The conveyor modules illustrated in that patent include a design wherein a portion of the connecting chain pin is exposed to the flow of fluid through the assembly and is available for visual inspection. In some applications such open chain pin designs can be desirable to facilitate cleaning of the conveyor assembly and to permit visual inspection of the conveyor assembly. More particularly, in applications wherein a modular conveyor assembly is used to carry food stuffs or other articles for human consumption, or in other applications requiring sanitary operating conditions, the conveyor assembly must be cleaned and inspected for cleanliness. For example, in the meat and poultry industries, government regulations require inspection of conveyor assemblies for cleanliness. Other constructions of modules for use in a conveyor assembly and which incorporate an open pin design are shown in U.S. Pat. No. 4,832,187, which issued to Lapeyre on May 23, 1989; U.S. Pat. No. D286,136, which issued to Schroeder et al. on Oct. 14, 1986; and U.S. Pat. No. D282,907 which issued to Schroeder et al. on Mar. 11, 1986.

Among the relevant design criteria for a modular conveyor assembly is the provision of a drive mechanism for advancing the conveyor assembly and the provision of a module having a drive surface adapted to be engaged by the drive mechanism. The conveyor assembly disclosed in U.S. Pat. No. 4,865,183, which issued to Hodlewsky et al. on Sep. 12, 1989, illustrates modules having end links providing a drive surface adapted to be engaged by a sprocket tooth of a drive sprocket. The conveyor assemblies illustrated in the aforementioned U.S. Pat. No. 4,556,142, include modules which have spaced apart link ends and which provide drive surfaces defined by structure located intermediate the spaced link ends. The conveyor chain illustrated in U.S. Pat. No. Re. 30,341, which reissued to Lapeyre on Jul. 22, 1980, includes modules having link ends which provide generally cylindrical drive surfaces adapted to be engaged by a sprocket tooth of a drive sprocket.

Further examples of conveyor assemblies are also illustrated in the following U.S. Patents: U.S. Pat. No. D270,201, which issued to Hodlewsky et al. on Aug. 16, 1983, illustrates a module for use in a conveyer assembly which incorporates a design to enclose the connecting chain pins. U.S. Pat. No. D284,640, which issued to Schroeder et al on Jul. 15, 1986, illustrates a module for use in a conveyor assembly which incorporates a design to enclose the connecting chain pins.

SUMMARY OF THE INVENTION

The invention provides a conveyor chain assembly which provides an article support surface and which includes a plurality of modules having a construction providing for the free flow of fluid through the conveyor assembly in a direction generally perpendicular to the support surface. The conveyor chain assembly incorporates an open pin design and, in one embodiment, is comprised of modules having link ends which provide drive surfaces adapted to be engaged by a drive mechanism.

More particularly, the invention provides a conveyor chain assembly including a plurality of modules linked together by a plurality of chain pins, each of the modules including a plurality of forwardly extending link ends each having a bore housing a chain pin, at least a plurality of the link ends each having a rearwardly facing opening communicating with the bore therein such that a portion of the chain pin is exposed, and at least a plurality of the forwardly extending link ends having a forwardly facing drive surface adapted to be engaged by a sprocket tooth of a drive sprocket or by a similar drive mechanism. Each of the modules also includes a plurality of rearwardly extending link ends each having a bore housing a chain pin, at least a plurality of the rearwardly extending link ends having a forwardly facing opening communicating with the bore such that a portion of the chain pin is exposed, and at least a plurality of the rearwardly extending link ends having a rearwardly facing drive surface adapted to be engaged by a sprocket tooth of a drive sprocket or by a similar drive mechanism.

The invention also provides a conveyor chain assembly including a plurality of forwardly extending link ends having an upper surface, a plurality of rearwardly extending link ends having an upper surface and a plurality of reach bars having an upper surface, the reach bars extending between and connecting respective ones of the forwardly and rearwardly extending link ends such that the upper surfaces of the forward and rearward link ends and the reach bars define a support surface. The forwardly and rearwardly extending link ends and the reach bars also define therebetween a plurality of openings for flow of fluid through the openings in a direction generally perpendicular to the support surface. More particularly, the reach bars each have an upper edge which is formed by an aerodynamic, generally convex upper surface which has a bullet-shaped cross-sectional configuration when viewed in a plane generally perpendicular to the length of the reach bar. The reach bars are relatively thin and extend directly between the link ends. The aerodynamic configuration of the reach bars minimizes resistance to the flow of fluid through the conveyor assembly. The relatively thin, convex upper surfaces of the reach bars also provide an article support surface which minimizes the surface contact between the conveyor and the articles placed thereon. Minimization of surface contact can reduce sticking or flash-freezing between the conveyor assembly and articles placed thereon and can also ease cleaning of the conveyor assembly.

The invention also provides an open area conveyor assembly having a relatively small pitch. The provision of a relatively small pitch allows the conveyor assembly to be driven by a relatively small drive mechanism and facilitates the transfer of articles to and from the conveyor assembly. The invention also provides an open area conveyor assembly which provides an article support surface which can support relatively small articles thereon without the articles falling through the openings in the conveyor assembly.

Various other features and advantages of the invention will become apparent to those skilled in the art upon review of the following detailed description, claims and drawings.

DESCRIPTION OF THE DRAWINGS

FIG. 1 illustrates a conveyor chain assembly embodying of the invention.

FIG. 2 is a bottom plan view of a conveyor chain module illustrated in FIG. 1.

FIG. 3 is a view taken along line 3—3 in FIG. 1.

FIG. 4 is a view taken along line 4—4 in FIG. 1.

FIG. 5 is a perspective view of a portion of the assembly shown in FIG. 1.

FIG. 6 is a top plan view of the module shown in FIG. 2.

FIG. 7 is a front elevational view of the module shown in FIG. 2.

FIG. 8 is a rear elevational view of the module shown in FIG. 2.

FIG. 9 is an elevational view of the side of the module shown in FIG. 2.

FIG. 10 is an elevational view of the other side of the module shown in FIG. 2.

FIG. 11 is a view taken along line 11—11 in FIG. 7.

FIG. 12 is a view taken along line 12—12 in FIG. 2.

Before one embodiment of the invention is explained in detail, it is to be understood that the invention is not limited in its application to the details of construction and the arrangements of components set forth in the following description or illustrated in the drawings. The invention is capable of other embodiments and of being practiced or carried out in various ways. Also, it is to be understood that the phraseology and the terminology used herein is for the purpose of description and should not be regarded as limiting.

DESCRIPTION OF THE PREFERRED EMBODIMENT

Illustrated in FIG. 1 is an open area conveyor chain assembly 10 embodying various features of the invention. The conveyor chain assembly 10 includes a plurality of integrally formed, generally elongated modules 12 which are pivotally connected to one another by a plurality of chain pins 14.

Each of the modules 12 includes a plurality of forwardly extending link ends 16 which are spaced apart along the length of the module 12. Each of the forward link ends 16 includes (FIG. 5) an upper surface 18, each of which lie in the same plane, and a generally cylindrical barrel portion 20 which has opposite sides 22 and which defines a rounded, generally cylindrical and forwardly facing surface 24 which extends between the opposite sides 22 of the barrel portion 20 and which is adapted to be engaged by the drive tooth of a drive sprocket (not shown) driven by a drive shaft (not shown) or to be engaged by a similar drive mechanism. Each forward link end 16 also includes a bore 26 which extends axially through the link end 16 between the opposite sides 22 of the barrel portion 20. As shown in FIG. 1, the bore 26 has a diameter which is sufficiently large to house a portion of a chain pin 14.

Each forward link end 16 also defines (FIGS. 8 and 12) a rearwardly facing opening 28 which communicates with the bore 26 intermediate the opposite sides 22 of the barrel portion 20 and which (FIG. 1) exposes a portion of the chain pin 14. As shown in FIG. 12, the opening 28 has a height which is approximately equal to the diameter of the chain pin 14 and a width which is approximately equal to the height. The forward link ends 16 define the opening 28 such that the chain pin 14 is exposed for visual inspection and cleaning from above and below.

The bore 26 extends through each of the forward link ends 16 and defines (FIG. 11) a rearwardly facing, generally cylindrical surface 30 which extends between the opposite sides 22 of the forward link end 16. Because of the rearwardly facing opening 28 communicating with the bore 26, each forward link end 16 also includes a pair of forwardly facing, generally cylindrical surfaces 32 which are defined by the bore 26, which extend between one of the opposite sides 22 of the forward link end 16 and the rearwardly facing opening 28, and which are in opposed facing relation to the cylindrical surface 30.

Each module 12 also includes (FIGS. 2 and 3) a plurality of rearwardly extending link ends 34 which are spaced apart along the length of the module 12 and which are spaced from the forward link ends 16. Each of the rearward link ends 34 includes a (FIG. 5) substantially flat upper surface 36 and a generally cylindrical barrel portion 38 which has opposite sides 40 and which defines (FIG. 3) a rounded, generally cylindrical and rearwardly facing drive surface 42 which extends between the opposite sides 40 of the barrel portion 38 and which is adapted to be engaged by the drive tooth of a drive sprocket (not shown) or by a similar drive mechanism. Because the forwardly facing drive surface 16 and the rearwardly facing drive surface 42 are both adapted to be engaged by a drive mechanism, the conveyor assembly 10 can be driven bi-directionally.

Each of the rearwardly extending link ends 34 also includes a bore 44 which extends axially between the opposite sides 40 of the barrel portion 38 and which houses a portion of one of the chain pins 14. Each rearward link end 34 also defines (FIGS. 5 and 12) a forwardly facing opening 46 which communicates with the bore 44 intermediate the opposite sides 40 of the barrel portion 38 and which exposes the chain pin 14. As shown in FIG. 12, the opening 28 has a height which is approximately equal to the diameter of the chain pin 14 and a width which is approximately equal to the height. The rearward link ends 34 define the opening 46 so that the chain pin 14 is exposed for visual inspection and cleaning from above and below.

The bore 44 in each rearward link end 34 defines (FIGS. 5 and 11) a forwardly facing, generally cylindrical surface 48 which extends between the opposite sides 40 of the barrel portion 38. Because of the forwardly facing opening 46 in each rearward link end 34, the bore 44 also defines a pair of rearwardly facing, generally cylindrical surfaces 50 which extend between one of the opposite sides 40 of the barrel portion 38 and the opening 46, and which are in opposed facing relation to the forwardly facing surface 50.

Each module 12 also includes (FIG. 2) a plurality of reach bars 52 which extend between respective forwardly and rearwardly extending link ends 16, 34. Each reach bar 52 has a lower edge 54, an upper edge 56 (FIG. 4) which, for reasons discussed below, is defined by an upwardly facing convex upper surface 58 having a generally bullet-shaped cross-sectional configuration when viewed in a plane generally perpendicular to the length of the reach bar 52, and a relatively vertical, thin web 60 which extends between the lower and upper edges 54, 56. More particularly, each reach bar 52 extends between one of the opposite sides 22 of a forward link end 16 and one of the opposite sides 40 of a rearward link end 34. Because, as shown in FIG. 2, the forward and rearward link ends 16, 34 are spaced apart along the length of the module 12, and because the webs 60 are relatively thin, the reach bars 52 extend at an oblique angle relative to the length of the module 12.

As shown in FIG. 2, a pair of reach bars 52 extend from each of the link ends 16, 34 so that a reach bar 52 extends from each side of the rearwardly and forwardly facing openings 28, 46. A first reach bar 52 extends from one of the opposite sides 22, 40 of the barrel portions 20, 38 and a second reach bar 52 extends from the other opposite side 22, 40 of the barrel portions 20, 38 so that the openings 28, 46 extend between the pair of reach bars 52. As mentioned above, each of the reach bars 52 extend at an oblique angle relative to the length of the module, and each of the pair of reach bars 52 extends at a divergent angle relative to the other of the pair of reach bars 52, so that each of the modules 12 comprises a plurality of the link ends 16, 34 and reach bars 52 configured in a zig-zag or crank-like arrangement.

The conveyor assembly 10 also includes means 70 for retaining the chain pin 14 within the forwardly and rearwardly extending link ends 16, 34 At one side 72 of the conveyor assembly 10 (the right side in FIG. 1), the modules 12 include a first side link end 74 which limits axial movement of the chain pin in the direction of the one side 72. As shown in FIG. 1, the first side link end 74 has a bore 76 which is axially aligned with the bores 26, 44 in the rearwardly and forwardly extending link ends 16, 34 and which has a blind end 77. A chain pin 14 extends into the bore 76 in the first side link end 74 but is prevented from moving toward the one side 72 (to the right in FIG. 1) of the conveyor assembly 10 by the blind end 77 of the bore 76.

At the opposite side 78 (the left side in FIG. 1) of the conveyor assembly 10, the modules 12 provide a second side link end 80 having a bore 82 which extends therethrough and which is aligned with the bores 26, 44. As shown in FIGS. 1 and 6, the means 70 for retaining the chain pin 14 also includes a selectively removable end cap 84 which engages the second side link end 80 and which substantially occupies the bore 82 so as to prevent movement of the chain pin 14 toward the opposite side 78 (to the left in FIG. 1) of the conveyor assembly 10.

The conveyor assembly 10 can be assembled by placing rows of modules 12 in interdigited relation so that the forwardly and rearwardly extending link ends 16, 34 mesh and so that the bores 26, 34 align. A chain pin 14 is then slid through the second side link end 80 and into the bores 26, 44. The chain pin 14 is retained between the opposite sides 72, 78 of the conveyor assembly 10 by the first side link end 74 and by the end cap 84 in the second side link end 80.

In alternative arrangements, the chain pin 14 can be retained within the forwardly and rearwardly extending link ends 16, 34 by deforming the ends of the chain pin 14 once the chain pin 14 is housed by the bores 26, 44. If plastic chain pins are used, the ends of the chain pin 14 can be thermally deformed to form a head sufficiently large to prevent dislocation of the chain pin 14 from the bores 26, 44.

During operation of the conveyor assembly 10, tensile forces are transmitted between rows of modules 12 by the engagement of the link ends 16, 34 with the connecting chain pins 14. In the disclosed embodiment, this transfer of tensile forces results in shearing forces acting on the chain pins 14 and on the forwardly and rearwardly extending link ends 16, 34. For example, tensile forces acting between a first row of modules 12 and a second row of modules 12 will be transferred by the engagement of the chain pins 14 and the load-bearing, cylindrical surfaces 30, 48 which are defined by the bores 26, 34 and which extend across the entire width of the link ends 16, 34. In the forward link ends 16, the tensile forces act against the rearwardly facing cylindrical surface 30, and not against the pair of forwardly facing cylindrical surfaces 32. Because the load-bearing surface 30 extends across the entire width of the forwardly extending link end 16, the tensile forces are distributed across a greater surface area, which reduces stress in the forward link end 16.

Similarly, in the rearward link ends 34, tensile forces act against the forwardly facing surface 48, and not the pair of rearwardly facing cylindrical surfaces 50. Because the forwardly facing surface 48 extends across the entire width of the rearward link end 34, the tensile forces are distributed across a greater surface area, which reduces stress in the rearward link end 34.

When the rows of modules 12 are connected by chain pins 14, the tensile forces acting on the chain pins 14 through rearwardly facing, load bearing surfaces 30 and the forwardly facing, load bearing surfaces 48 result in shear on the chain pins 14. Depending on the type of materials used for the modules 12 and for the chain pins 14, failure of the conveyor assembly 10 due to overloading can result in either deformation of the chain pins 14 due to shear, or deformation of the elongated modules 12 due to tension. It has been found that when a conveyor assembly 10 having the disclosed construction fails due to failure of the module 12, the reach bars 52, rather than the link ends 16, 34, deform and become elongated. Because, when the module 12 fails, failure does not occur at the link ends 16, 34, material can be removed from the link ends 16, 34. Thus, the rearwardly and forwardly facing openings 28, 46, which represent a lack of material in the link ends 16, 34, do not contribute to failure of the elongated modules 12 and can be provided without compromising the overall tensile strength of the conveyor assembly 10.

A conveyor assembly 10 having a satisfactory overall tensile strength has been obtained by forming unitary modules 12 and chain pins 14 of acetal resin, however, any moldable, high-strength plastic can be successfully used. An overall tensile strength of approximately 2100 pounds for a conveyor assembly having a 12 inch width can be realized by using these materials. Substitution of steel connecting pins for the plastic chain pins can increase the realized strength of the conveyor assembly 10 to approximately 4300 pounds.

Each module 12 also includes (FIG. 1) a support rib 90 which extends between the upper edges 56 of the reach bars 52 intermediate the link ends 16, 34 and which extends generally parallel to the chain pins 14 and along the length of the module 12. Each support rib 90 (FIG. 3) has an upper edge 92 and a lower surface 94 which is spaced from the lower edge 54 of the reach bars 52. For reasons discussed below, the upper edge 92 of the support rib 90 is defined by an upwardly facing, convex upper surface 95. When viewed in cross-section in a plane which is generally perpendicular to the length of the support rib 90, the upper surface 95 of the support rib 90 has a generally bullet-shaped configuration and is substantially equidistant from the cylindrical surfaces 24 and 42.

The upper surfaces 18, 36 of the forwardly and rearwardly extending link ends 16, 34, the upper surface 58 of the reach bars 52, and the upper surface 95 of the support rib 90 of the plurality of modules 12 provide (FIG. 3) an article support surface 96. The link ends 16, 34, the reach bars 52 and the support rib 90 also define therebetween a plurality of openings 98 adapted to provide for a free flow of fluid through the modules 12 in a direction generally perpendicular to the support surface 96. For example, the openings 98 are adapted to provide for free flow of air through the conveyor assembly 10 for the cooling or drying of articles placed thereon.

The aerodynamic, bullet-shaped configuration of the respective upper surfaces 95, 58 of the support rib 90 and the reach bars 52 minimize the amount of surface contact between the conveyor assembly 10 and articles placed thereon. Minimization of the surface contact between the conveyor assembly 10 and articles placed thereon can minimize the amount of flash-freezing or sticking which can occur between the article and the conveyor assembly 10 and can ease cleaning of the conveyor assembly 10. The bullet-shaped, upper surfaces 58, 95 of the reach bars 52 and the support rib 90 also reduce turbulence in the flow of fluid passing through the conveyor assembly 10, and thereby minimize resistance to the passage of the flow therethrough.

One of the advantages of the conveyor assembly disclosed herein is that the conveyor assembly can be constructed to have a relatively small pitch. The provision of a relatively small pitch allows the conveyor assembly to be driven by a relatively small drive mechanism and facilitates the transfer of articles to and from the assembly. More particularly, because the conveyor assembly is adapted to be driven by the teeth of a drive sprocket driven by a drive shaft, the provision of a conveyor assembly having a relatively small pitch allows the pitch of the drive sprocket, and therefore the respective diameters of the drive sprocket and drive shaft to be reduced. By reducing the size of the drive mechanism, the overall size of the conveyor assembly is also reduced. Reduction of the pitch of the conveyor assembly permits use of a drive sprocket having a relatively small chordal thickness which reduces the chordal action or vertical deflection of the conveyor as the conveyor moves over the drive mechanism. As a result, the transfer of articles transfer of articles to and from the conveyor assembly can be made smoother and more easily accomplished. The conveyor assembly thus provides a high-strength conveyor which has a relatively large amount of open area, a relatively small pitch and which can carry relatively small articles thereon.

Various features of the invention are set forth in the following claims.

I claim:

1. A module for use in a conveyor chain assembly including a plurality of modules linked together in end to end relation by a plurality of chain pins, each of the chain pins having a diameter, the module comprising a plurality of forwardly extending link ends, each forwardly extending link end having a bore, the bores of the forwardly extending link ends being axially aligned and having a diameter that is slightly larger than the diameter of a chain pin and that is sufficiently large to house the chain pin, and each of the forwardly extending link ends having therein a rearwardly facing opening communicating with the bore and adapted to expose a portion of the chain pin, a plurality of rearwardly extending link ends, each rearwardly extending link end including a rearwardly facing drive surface to be engaged by a sprocket tooth of a chain sprocket and including a bore, the bores of the rearwardly extending link ends being axially aligned and having a diameter that is slightly larger than a diameter of the chain pin and that is sufficiently large to house the chain pin, each rearwardly extending link end having a forwardly facing opening communicating with the bore and adapted to expose a portion of the chain pin, a plurality of reach bars extending between and connecting respective ones of the forwardly and rearwardly extending link ends, each of the reach bars including an upper edge and a lower edge, and a support rib extending between the upper edges of the reach bars and being spaced from the lower edges of the reach bars and wherein the support rib is centrally located intermediate the forwardly extending link ends and the rearwardly extending link ends.

2. A module as set forth in claim 1 wherein the forwardly and rearwardly extending link ends have an upper surface, wherein the reach bars have an upper surface, and wherein the upper surfaces of the forwardly and rearwardly extending link ends and the upper surface of the reach bars provide a support surface, and wherein the forwardly and rearwardly extending link ends and the reach bars define therebetween a plurality of openings adapted to provide for a free flow of fluid through the modules in a direction generally perpendicular to the support surface.

3. A module as set forth in claim 2 wherein in the upper surface of the reach bars has a generally convex cross sectional configuration in a plane generally perpendicular to the length of the reach bar.

4. A module as set forth in claim 1 wherein each of said support ribs extend in the direction of the chain pins.

5. A module as set forth in claim 4 wherein the forwardly and rearwardly extending link ends each have an upper surface, wherein the reach bars and the rib has an upper surface, and wherein the upper surfaces of the forwardly and rearwardly extending link ends, the reach bars and the support rib provide a support surface and, wherein the forwardly and rearwardly extending link ends, the reach bars and the support rib define therebetween a plurality of openings adapted to provide for a free flow of fluid through the modules in a direction generally perpendicular to the support surface.

6. A module as set forth in claim 5 wherein the upper surface of the reach bars has a generally convex cross sectional configuration in a plane generally perpendicular to the lengths of the reach bars, and wherein the upper surface of the support rib has a generally convex cross sectional configuration in a plane generally perpendicular to the length of the support rib.

7. A module as set forth in claim 1 wherein the drive surface is generally cylindrical.

8. A module as set forth in claim 1 wherein each of the forwardly and rearwardly extending link ends includes a pair of reach bars extending therefrom.

9. A module as set forth in claim 1 wherein each of said forwardly and rearwardly extending link ends has opposite sides, and wherein one of the pair of reach bars extends from one of the opposite sides adjacent the opening and the other of the pair of reach bars extends from the other opposite side adjacent the opening.

10. A module for use in a conveyor chain assembly including a plurality of modules linked together in end to end relation by a plurality of chain pins, each of the chain pins having a diameter, the module comprising
a plurality of forwardly extending link ends, each forwardly extending link end having opposite ends and a bore extending between the opposite ends, the bores of the forwardly extending link ends being axially aligned and each having a diameter that is slightly larger than the diameter of a chain pin and that is sufficiently large to house the chain pin, and
a plurality of rearwardly extending link ends, each rearwardly extending link end having opposite sides, a rearwardly facing drive surface to be engaged by a sprocket tooth of a chain sprocket and having a bore, the bores of the rearwardly extending link ends extending between the opposite sides of the rearwardly extending link ends, being axially aligned and each having a diameter that is slightly larger than a diameter of the chain pin and that is sufficiently large to house the chain pin,
a plurality of reach bars extending from and connecting respective opposite sides of the forwardly and rearwardly extending link ends,
a first plurality of pairs of the reach bars extending from the forwardly extending link ends and providing a pair of generally planar opposed surfaces having upper and lower edges and extending rearwardly at an oblique angle relative to the length of the module, and the first plurality of pairs of the reach bars also providing a rearwardly facing, semi-cylindrical transition surface extending generally vertically between the upper and lower edges and blending smoothly between the planar surfaces, the rearwardly facing transition surface having a therein an opening communicating with the bore and adapted to expose a portion of the chain pin,
a second plurality of the reach bars extending from the rearwardly extending link ends and providing a pair of generally planar opposed surfaces having upper and lower edges and extending forwardly at an oblique angle relative to the length of the module, and the second plurality of pairs of the reach bars also providing a forwardly facing, semi-cylindrical transition surface extending generally vertically between the upper and lower edges and blending smoothly between the planar surfaces, the forwardly facing transition surface having therein an opening communicating with the bore and adapted to expose a portion of the chain pin, and
a support rib extending between the upper edges of the reach bars and being spaced from the lower edges of the reach bars.

* * * * *